(12) United States Patent
Yamanaka

(10) Patent No.: US 10,370,025 B2
(45) Date of Patent: Aug. 6, 2019

(54) CONTROL DEVICE AND ELECTRIC POWER STEERING APPARATUS

(71) Applicant: DENSO CORPORATION, Kariya-city, Aichi-pref. (JP)

(72) Inventor: Takahiro Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 179 days.

(21) Appl. No.: 15/089,067

(22) Filed: Apr. 1, 2016

(65) Prior Publication Data
US 2016/0297471 A1    Oct. 13, 2016

(30) Foreign Application Priority Data

Apr. 10, 2015 (JP) .................................. 2015-80768

(51) Int. Cl.
*B62D 5/04* (2006.01)
*H02P 6/28* (2016.01)
*H02P 27/06* (2006.01)
*H02P 6/08* (2016.01)

(52) U.S. Cl.
CPC ......... *B62D 5/0463* (2013.01); *B62D 5/0409* (2013.01); *H02P 6/085* (2013.01); *H02P 27/06* (2013.01); *H02P 2201/09* (2013.01)

(58) Field of Classification Search
CPC ....... B62D 5/0463; B62D 5/0409; H02P 6/28; H02P 27/00; H02P 27/06
See application file for complete search history.

(56) References Cited

U.S. PATENT DOCUMENTS

| | | | |
|---|---|---|---|
| 6,374,941 B1* | 4/2002 | Forborgen | B62D 15/02 180/444 |
| 2003/0071587 A1 | 4/2003 | Suzuki et al. | |
| 2004/0070354 A1* | 4/2004 | Krueger | H02P 6/28 318/400.32 |
| 2005/0038585 A1* | 2/2005 | Asaumi | B62D 5/0463 701/43 |

(Continued)

FOREIGN PATENT DOCUMENTS

| | | |
|---|---|---|
| JP | 2008-279953 | 11/2008 |
| JP | 2011-166923 A | 8/2011 |

(Continued)

*Primary Examiner* — Joseph M Rocca
*Assistant Examiner* — Maurice L Williams
(74) *Attorney, Agent, or Firm* — Knobbe, Martens, Olson & Bear, LLP

(57) ABSTRACT

A control device controls an operation of an electric motor, which is rotated by an electric power supplied from a battery. The control device includes an inverter, a controller and a booster. The inverter includes switching elements. The inverter converts an electric power supplied from the battery and supplies the converted electric power to the motor. The controller is operated by the electric power, which is supplied from the battery, to control the operation of the inverter. The booster boosts the voltage, which is inputted from the battery, and the booster outputs the boosted voltage to the controller. In a case where the voltage of the electric power supplied from the battery to the controller is dropped, the electric power, which has the voltage boosted by the booster, can be inputted to the controller.

8 Claims, 4 Drawing Sheets

(56) References Cited

U.S. PATENT DOCUMENTS

| | | | |
|---|---|---|---|
| 2009/0079373 A1* | 3/2009 | Nagase | B62D 5/0487 318/400.22 |
| 2009/0096394 A1* | 4/2009 | Taniguchi | H02M 1/32 318/400.09 |
| 2009/0292454 A1 | 11/2009 | Nakai | |
| 2010/0085019 A1* | 4/2010 | Masuda | |
| 2011/0066331 A1* | 3/2011 | Yamashita | B62D 5/0463 701/42 |
| 2011/0231064 A1 | 9/2011 | Abe et al. | |
| 2012/0150406 A1* | 6/2012 | Tomura | |
| 2013/0134911 A1* | 5/2013 | Kanakasabai | H02P 27/14 318/400.3 |
| 2014/0176027 A1* | 6/2014 | Osaki | |
| 2014/0203559 A1* | 7/2014 | Wagoner | H02M 5/4585 290/44 |
| 2014/0229062 A1* | 8/2014 | Kimura | B62D 5/0481 701/41 |
| 2014/0265959 A1* | 9/2014 | Fuse | B62D 5/0484 318/400.21 |
| 2014/0265979 A1* | 9/2014 | Xu | H02P 6/12 318/478 |
| 2014/0271272 A1* | 9/2014 | Jeon | H02M 7/06 417/410.1 |
| 2014/0292071 A1* | 10/2014 | Takeda | |
| 2015/0042250 A1 | 2/2015 | Yamato et al. | |
| 2015/0042255 A1* | 2/2015 | Ried | H02P 27/06 318/504 |
| 2015/0085403 A1* | 3/2015 | Santos | H02P 27/06 361/33 |
| 2015/0251690 A1 | 9/2015 | Yamamoto | |
| 2016/0028336 A1* | 1/2016 | Oyama | H02P 27/06 318/564 |
| 2016/0043634 A1* | 2/2016 | Bemat | H02M 1/4225 713/300 |

FOREIGN PATENT DOCUMENTS

| | | |
|---|---|---|
| JP | 5257389 B2 | 5/2013 |
| JP | 2013-256201 A | 12/2013 |
| JP | 2015-049042 | 3/2015 |

* cited by examiner

CONTROL DEVICE AND ELECTRIC POWER STEERING APPARATUS

CROSS REFERENCE TO RELATED APPLICATION

This application is based on and incorporates herein by reference Japanese Patent Application No. 2015-80768 filed on Apr. 10, 2015.

TECHNICAL FIELD

The present disclosure relates to a control device and an electric power steering apparatus having the same.

BACKGROUND

Previously, it is known that cranking of an internal combustion engine, which is executed after execution of idling reduction (also referred to as idling stop or no idling) of the internal combustion engine, causes a drop of a power source voltage, which is supplied to an electric power steering (EPS) apparatus. JP2013-163515A (corresponding to US2011/0231064A1) discloses an electric power steering apparatus, which maintains steering assistance for assisting a steering operation of a driver of a vehicle while limiting the electric current supplied to the motor at the time of dropping the electric source voltage.

However, depending on the time of cranking, the electric source voltage may possibly drop below a required minimum operating voltage of an electronic control unit (EPS-ECU) of the electric power steering apparatus to possibly cause rebooting of the EPS-ECU or stopping of the operation of the EPS-ECU. In such a case, the electric power steering apparatus cannot maintain the steering assistance, so that the driver of the vehicle may have annoying feeling.

In view of the above point, it is conceivable to connect a DC-DC converter between the battery and the EPS-ECU to input a voltage, which is boosted by the DC-DC converter, to the EPS-ECU. The EPS-ECU includes an electric power converter, which drives the motor, and a controller, which controls an operation of the electric power converter. A required electric power of the electric power converter and a required electric power of the controller are different from each other. Therefore, when the DC-DC converter is designed in conformity with the electric power converter, which requires the relatively high voltage, in order to limit the drop of the input voltage, which is inputted to the EPS-ECU, the size of the DC-DC converter is unduly increased.

SUMMARY

The present disclosure is made in view of the above points.

According to the present disclosure, there is provided a control device for controlling an operation of an electric motor, which is rotated when the electric motor is powered by electric power supplied from an electric power source. The control device includes an electric power converter, a controller and a booster. The electric power converter includes a plurality of switching elements. The electric power converter converts the electric power supplied from the electric power source and supplies the converted electric power to the electric motor. The controller is operated by the electric power supplied from the electric power source and controls an operation of the electric power converter. The booster is operable to boost a voltage of the electric power inputted from the electric power source and to output the boosted voltage to the controller.

According to the present disclosure, there is also provided an electric power steering apparatus, which includes the control device and the electric motor discussed above. The electric motor is controlled by the control device to output an assist torque, which assists a steering operation of a steering wheel that is operated by a driver of a vehicle.

BRIEF DESCRIPTION OF THE DRAWINGS

The drawings described herein are for illustration purposes only and are not intended to limit the scope of the present disclosure in any way.

DETAILED DESCRIPTION

Figure 1:
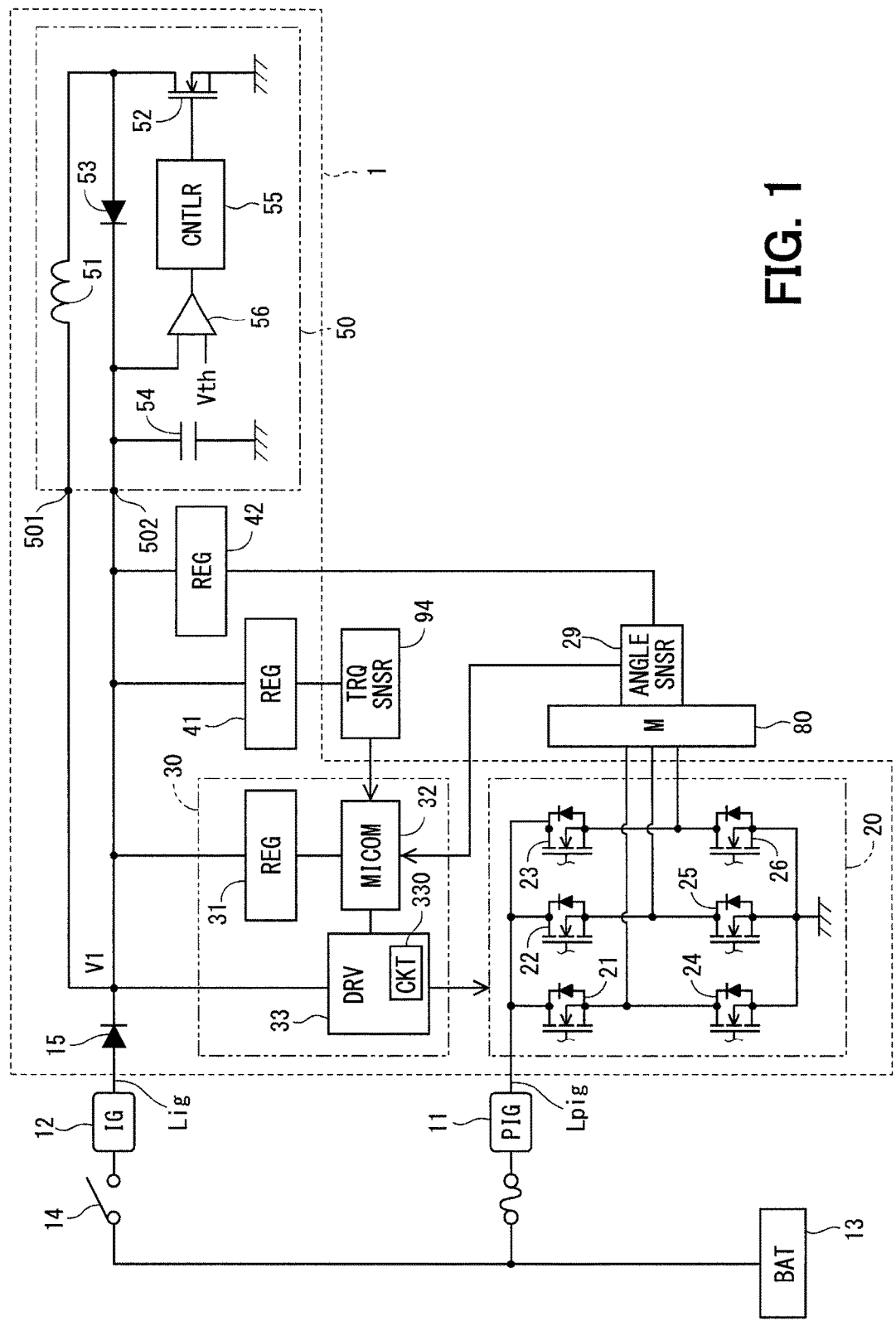
FIG. 1 is a schematic diagram showing a control device according to a first embodiment of the present disclosure.

Various embodiments of the present disclosure will be described with reference to the accompanying drawings. In the following embodiments, similar components will be indicated by the same reference numerals and will not be described redundantly for the sake of simplicity.

First Embodiment

A control device according to a first embodiment of the present disclosure will be described with reference to FIGS. 1 to 4.

As shown in FIG. 1, the control device 1 of the present embodiment controls an operation of an electric motor (hereinafter referred to as a motor) 80, which is rotated when the electric motor 80 is powered by electric power supplied from a battery 13. The motor 80 is, for example, a three-phase brushless motor.

The control device 1 and the motor 80 are used in an electric power steering (EPS) apparatus, which assists a steering operation of a steering wheel that is operated by a driver of a vehicle (e.g., an automobile) to steer drive wheels of the vehicle. Specifically, the control device 1 is an electronic control unit (EPS-ECU) for the electric power steering apparatus.

Figure 2:
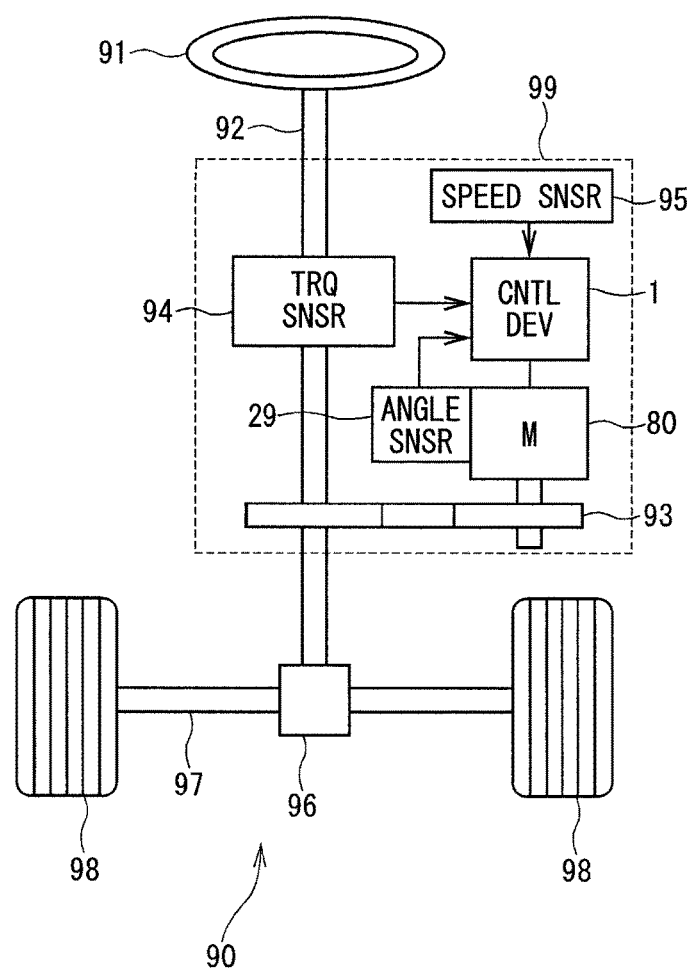
FIG. 2 is a schematic diagram schematically indicating a steering system having an electric power steering apparatus according to the first embodiment.

First of all, the electric power steering apparatus 99 will be briefly described with reference to FIG. 2. FIG. 2 is a schematic diagram showing an entire structure of a steering system 90, which includes the electric power steering apparatus 99.

In the steering system 90, a steering shaft 92 is connected to a steering wheel 91, and a pinion gear 96 is installed to an end of the steering shaft 92. The pinion gear 96 is meshed with a rack shaft 97. Two drive wheels 98 are rotatably connected to two opposed end portions, respectively, of the rack shaft 97 through, for example, a tie rod. Thereby, when the driver rotates the steering wheel 91, the steering shaft 92, which is connected to the steering wheel 91, is rotated. Then, the rotational movement of the steering shaft 92 is converted into linear movement of the rack shaft 97 through the pinion gear 96, and the wheels 98 are steered for a corresponding angle that corresponds to the linear movement of the rack shaft 97.

The electric power steering apparatus 99 includes the motor 80, the control device 1 and a speed reducing gear 93. The motor 80 generates a steering assist torque that assists the steering operation of the steering wheel 91, which is operated by the driver of the vehicle to steer the wheels 98. The control device 1 controls the operation of the motor 80. The speed reducing gear 93 reduces a speed of rotation outputted from the motor 80 and transmits the rotation of the reduced speed to the steering shaft 92. The electric power steering apparatus 99 further includes a torque sensor 94, a vehicle speed sensor 95 and a rotational angle sensor 29 to obtain information that is required to control the operation of the motor 80. The torque sensor 94 senses a steering torque, which is inputted from the driver to the steering shaft 92 through the steering wheel 91. The vehicle speed sensor 95 senses a speed of the vehicle. The rotational angle sensor 29 senses a rotational position of the motor 80 (more specifically, a rotational position of an output shaft of the motor 80).

With the above-described structure, in the electric power steering apparatus 99, the motor 80 generates the steering assist torque, which assists the steering operation of the steering wheel 91 that is operated by the driver. The steering assist torque, which is generated from the motor 80, is transmitted to the steering shaft 92.

The electric power steering apparatus 99 of the present embodiment is a column assist power steering apparatus, which transmits the steering assist torque generated from the motor 80 to the steering shaft 92 that is also known as a steering column. Alternatively, the electric power steering apparatus 99 of the present embodiment may possibly be a rack assist power steering apparatus, which transmits the steering assist torque generated from the motor 80 to the rack shaft 97.

Next, the control device 1 of the present embodiment will be described with reference to FIG. 1.

The control device 1 is electrically connected to the battery (serving as an electric power source) 13 through an electric power source terminal 11 and is also electrically connected to the battery 13 through an ignition terminal 12. The electric power source terminal 11 is electrically connected to the high potential terminal (the cathode terminal) of the battery 13. The electric power of a predetermined voltage is supplied from the battery 13 to the electric power source terminal 11. The ignition terminal 12 is electrically connected to the high potential terminal (a cathode terminal) through an ignition switch 14. When the ignition switch 14 is turned on, the electric power is supplied from the battery 13 to the ignition terminal 12.

As shown in FIG. 1, the control device 1 includes an inverter 20, a diode 15, a controller 30, a regulator 41, a regulator 42, and a booster 50.

The inverter 20 is connected to a PIG electric power source line Lpig, which extends from the battery 13 through the electric power source terminal 11.

Furthermore, the inverter 20 is, for example, a three-phase inverter and includes a plurality (six in this embodiment) of switching elements 21-26, which are constructed to form a bridge connection. In the present embodiment, the switching elements 21-26 are, for example, metal oxide semiconductor field-effect transistors (MOSFETs). Among the switching elements 21-26, the switching elements 21, 22, 23 are high-side switching elements, and the switching elements 24, 25, 26 are low-side switching elements. Connections, at each of which a corresponding one of the high-side switching elements 21, 22, 23 and a corresponding one of the low-side switching elements 24, 25, 26 are connected with each other, are connected to ends, respectively, of three-phase windings of the motor 80 through power lines. When the switching elements 21-26 perform a switching operation, the electric power, which is supplied from the battery 13 through the electric power source terminal 11, is converted and is supplied to the motor 80.

The diode 15 is connected to, i.e., is inserted in an IG electric power source line Lig, which extends from the battery 13 through the ignition terminal 12. The diode 15 rectifies the electric power, which flows from the ignition terminal 12 to each corresponding portion of the control device 1.

The controller 30 includes a regulator 31, a microcomputer 32 and an inverter driver (serving as an electric power converter driver) 33.

The regulator 31 is connected to the IG electric power source line Lig and receives the electric power from the battery 13 through the ignition terminal 12. The regulator 31 regulates, i.e., stabilizes the received electric power such that a voltage of the received electric power is kept within a predetermined range, and the regulator 31 supplies the regulated electric power to the microcomputer 32. In this way, the microcomputer 32 is operable with the regulated electric power.

The microcomputer 32 is a semiconductor package, which includes a CPU, a ROM, a RAM and an input/output (I/O) circuit. The microcomputer 32 runs a program(s) stored in the ROM to execute computations based on information received from the sensors, such as the rotational angle sensor 29, the torque sensor 94 and the vehicle speed sensor 95, and the microcomputer 32 outputs control signals, which controls the corresponding portions of the control device 1.

The inverter driver 33 is connected to the IG power source line Lig and receives the electric power from the battery 13 through the ignition terminal 12. The inverter driver 33 applies a gate signal to each corresponding one of the switching elements 21-26 of the inverter 20 to operate each corresponding one of the switching elements 21-26. The inverter driver 33 includes a boost circuit (step-up circuit) 330, such as a charge pump, to execute the switching operation of the high-side switching elements 21-23.

As discussed above, the controller 30 is operated with the electric power received from the battery 13, and the controller 30 controls the operation of the motor 80 by controlling the operation of the inverter 20.

The regulator 41 and the regulator 42 are connected to the IG electric power source line Lig and receives the electric power from the battery 13 through the ignition terminal 12.

The regulator 41 regulates, i.e., stabilizes the received electric power such that the voltage of the received electric power is kept within a predetermined range, and the regulator 41 supplies the regulated electric power to the torque sensor 94. The regulator 42 regulates, i.e., stabilizes the received electric power such that the voltage of the received electric power is kept within a predetermined range, and the regulator 42 supplies the regulated electric power to the rotational angle sensor 29.

The booster 50 is operable to boost the voltage of the electric power, which is inputted from the battery 13 through the ignition terminal 12, and to output the boosted voltage to the controller 30 and the regulators 41, 42. The booster 50 of the present embodiment is a switching converter. The booster 50 includes a coil 51, a switching element 52, a diode 53, a capacitor 54, a boost controller 55 and a comparator 56.

One end of the coil 51 is connected to an input terminal 501 of the booster 50. The input terminal 501 is connected to the IG electric power source line Lig.

The switching element 52 is, for example, a MOSFET in this instance. A drain terminal of the switching element 52 is connected to the other end of the coil 51, and a source terminal of the switching element 52 is connected to a ground (earth).

The diode 53 is installed between the other end of the coil 51 and an output terminal 502 of the booster 50. A cathode terminal of the diode 53 is located on the output terminal 502 side. The output terminal 502 is connected to the IG electric power source line Lig at a location that is on a downstream side of the connecting point of the input terminal 501

One end of the capacitor 54 is connected between the diode 53 and the output terminal 502, and the other end of the capacitor 54 is connected to the ground.

The boost controller 55 is electrically connected to a gate terminal of the switching element 52.

An output terminal of the comparator 56 is electrically connected to the boost controller 55.

A voltage having a voltage value V1 of the electric power, which is supplied from the battery 13 through the ignition terminal 12, is inputted to one of two input terminals of the comparator 56. A voltage of a threshold value Vt is inputted from, for example, the microcomputer 32 to the other one of the two input terminals of the comparator 56.

The comparator 56 compares between the voltage value V1 and the threshold value Vth inputted through the two input terminals of the comparator 56, and the comparator 56 outputs the result of the comparison to the boost controller 55.

For instance, when the value, which is inputted from the comparator 56, is a positive value, the boost controller 55 does not output a gate signal to the switching element 52. Thereby, the switching element 52 is placed in an off state, so that the voltage of the input terminal 501 side and the voltage of the output terminal 502 side are equal to each other.

In contrast, when the value, which is inputted from the comparator 56, is a negative value, the boost controller 55 operates the switching element 52 to execute a switching operation such that the switching element 52 repeats an on-state and the off-state thereof. In this way, the voltage of the input terminal 501 is increased and is outputted from the output terminal 502.

That is, the booster 50 outputs the increased voltage (boosted voltage), which is generated by boosting the voltage of the input terminal 501, when the voltage value V1 of the electric power, which is inputted from the battery 13, is decreased below the threshold value Vth. In this way, the voltage of the electric power, which is supplied to the controller 30 and the regulators 41, 42, can be kept to be equal to or higher than the threshold value Vth.

The threshold value Vth is preferably set to be lower than a minimum value VNmin of the normal range of the voltage inputted from the battery 13 and higher than a required minimum operating voltage value VCmin of the controller 30. The normal range of the voltage inputted from the battery 13 is a voltage range of the normal time, in which a voltage change caused by, for example, cranking of the engine does not occur.

In the present embodiment, the required minimum operating voltage value VCmin of the controller 30 corresponds to a required minimum operating voltage value of the regulator 31. Also, the required minimum operating voltage value VCmin of the controller 30 is a voltage that guarantees the operations of the regulators 41, 42.

In the present embodiment, the regulator 31, the inverter driver 33, the booster 50 and the regulators 41, 42 may be integrated into a single chip or a single package. In this way, it is possible to avoid an increase in the costs or the size, which would be caused by the addition of the booster 50.

Although not depicted in FIG. 1 for the sake of simplicity, the control device 1 may further include a regulator that is connected to the IG electric power source line Lig and supplies the electric power to the vehicle speed sensor 95.

Figure 3:
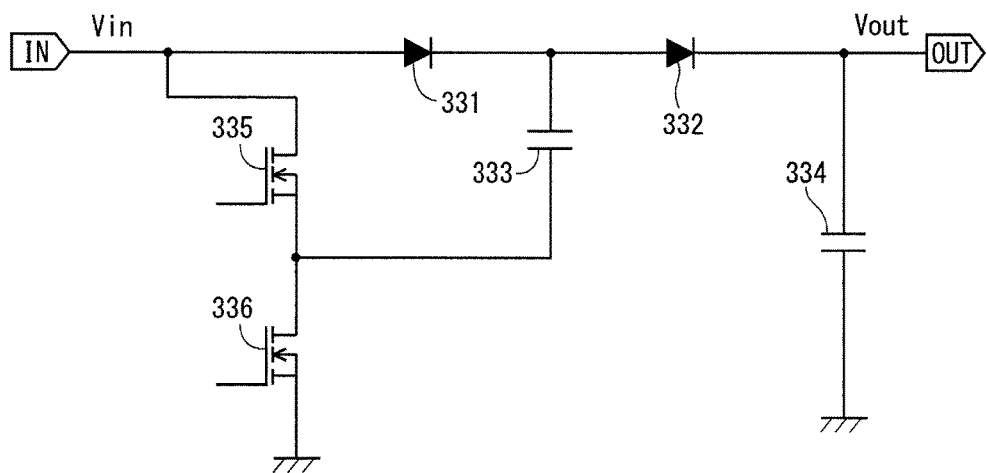
FIG. 3 is a circuit diagram indicating a boost circuit of a controller of FIG. 1.

The boost circuit 330 of the inverter driver 33 will be briefly described with reference to FIG. 3. FIG. 3 schematically indicates an example where the boost circuit 330 is constructed as a two-stage charge pump.

The boost circuit 330 includes diodes 331, 332, capacitors 333, 334 and switching elements (e.g., MOSFETs) 335, 336.

For example, in a state where the switching element 335 is turned off while the switching element 336 is turned on, the capacitor 333 is charged with a voltage of Vc1=Vin−Vf upon supply of the input voltage Vin to the capacitor 333. Here, Vf denotes a forward voltage of the respective diodes 331, 332.

Next, in a state where the switching element 335 is turned on while the switching element 336 is turned off, an output voltage Vout becomes Vout=Vin+Vc1−Vf, i.e, Vout=2Vin−2Vf.

When the switching elements 335, 336 are driven to execute a high speed switching operation thereof, the output voltage Vout, which is boosted to be two times higher than the input voltage Vin, is outputted.

Here, it should be noted that the number of the stages of the charge pump may be increased to increase the output voltage Vout.

In general, the output voltage Vout of the boost circuit 330 is used as a gate signal of the high-side switching elements 21-23 of the inverter 20 to execute the switching operations of these high-side switching elements 21-23. Specifically, the output voltage Vout of the boost circuit 330 is used to charge the electric charge to the gate terminal of the switching elements 21-23. Furthermore, in general, the input voltage Vin is used as a gate signal of the low-side switching elements 24-26 to execute the switching operations of these low-side switching elements 24-26. Alternatively, the output voltage Vout may be used as a gate signal of the low-side switching elements 24-26 to execute the switching operations of these low-side switching elements 24-26.

Here, the amount of gate charge, which is required to turn on the respective switching elements 21-26, is denoted as Qg. In such a case, the amount of electric charge of the capacitor 334, which is placed to be closest to the output side among the capacitors 333, 334 of the boost circuit 330, is set to satisfy a relationship of Qg×n<Q. Here, n denotes the number of the high-side switching elements 21-23 of the inverter 20, which is three in this embodiment. The capacitor 333 is arranged to charge the electric charge in the capacitor 334.

Now, advantages of the present embodiment will be described.

(1) As described above, the control device 1 of the present embodiment controls the operation of the motor 80 that is rotated by the electric power supplied from the battery 13, and the control device 1 includes the inverter 20, the controller 30 and the booster 50.

The inverter 20 includes the multiple switching elements 21-26. The inverter 20 converts the electric power supplied from the battery 13 and supplies the converted electric power to the motor 80. The controller 30 is operated by the electric power, which is received from the battery 13, to control the operation of the inverter 20. The booster 50 is operable to boost the voltage of the electric power received from the battery 13 and to output the boosted voltage to the controller 30.

With the above-described construction, in the case where the voltage of the electric power, which is supplied from the battery 13 to the controller 30, is dropped, the boosted voltage, which is boosted by the booster 50, can be supplied to the controller 30. Thus, it is possible to avoid the rebooting of the controller 30 or the stopping of the operation of the controller 30, and thereby the control operation for controlling the operation of the motor 80, can be continuously performed without interruption.

Furthermore, with the above described construction, the booster 50 can be designed in conformity with the controller 30 that is operable with the required minimum voltage, which is lower than the required minimum voltage of the inverter 20. Therefore, in comparison to the case where the booster is designed in conformity with the inverter for the purpose of limiting the drop of the input voltage applied to the control device, the size of the booster 50 can be reduced. Thus, the size of the control device 1, which includes the booster 50, can be reduced.

As a result, according to the present embodiment, there is provided the compact control device 1, which can maintain the control operation of the motor 80 even at the time of dropping of the power source voltage.

In general, the diode (the diode 15 in the present embodiment) is connected to the power source line of the ignition terminal. In contrast, a diode is not connected to the power source line of the power source terminal for the reason of, for example, recovering a regenerative electric current from the motor to the battery The booster 50 of the present embodiment is connected to the IG electric power source line Lig to boost the voltage of the electric power supplied from the battery 13 through the ignition terminal 12, and the diode 15 is connected between the ignition terminal 12 and the booster 50. Thus, even when the field decay (the negative surge voltage) is generated, the electric current does not flow through the switching element 52 of the booster 50. Therefore, it is possible to avoid a damage of the switching element 52 of the booster 50.

(2) In the present embodiment, the booster 50 boosts the voltage, which is inputted from the battery 13, in the case where the voltage, which is inputted from the battery 13, is reduced below the threshold value Vth. The threshold value Vth is preferably set to be lower than the minimum value VNmin of the normal range of the voltage inputted from the battery 13 and higher than the required minimum operating voltage value VCmin of the controller 30.

Figure 4:
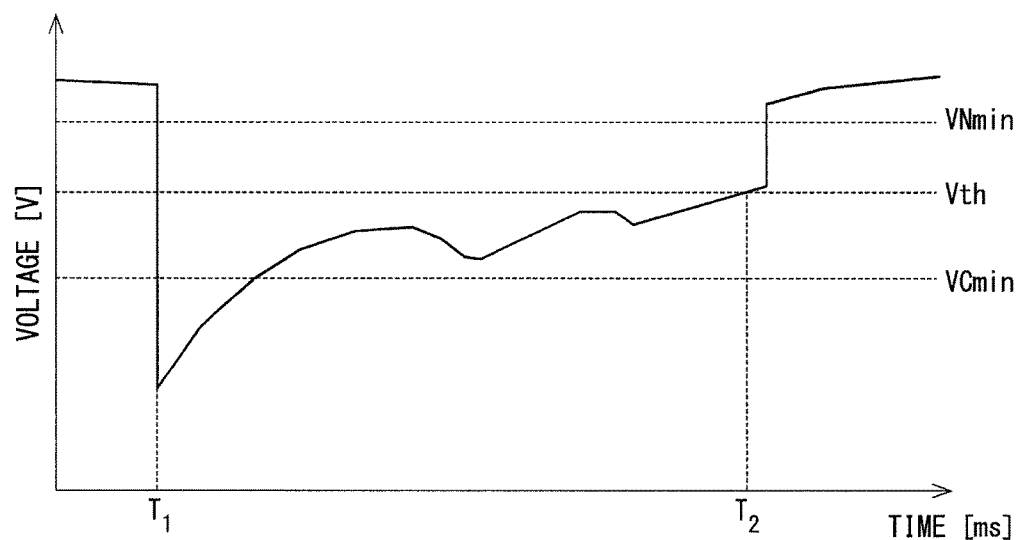
FIG. 4 is a graph indicating behavior of a battery voltage at the time of cranking an internal combustion engine.

For example, FIG. 4 is a graph that indicates the behavior of the voltage V1, which is inputted from the battery 13 to the control device 1, at the time of cranking of the engine.

In the example of FIG. 4, the booster 50 boots the voltage from the time (the time T1) of decreasing the voltage V1 below the threshold value Vth to the time (the time T2) of recovering of the voltage V1 to the threshold value Vth or higher. During this period, the boosted voltage, which is boosted by the booster 50, is supplied to the controller 30. Thus, the voltage, which is inputted to the controller 30, can be kept to be equal to or higher than the threshold value Vth.

Here, the threshold value Vth of the voltage V1 is set to be lower than the minimum value VNmin of the normal range of the voltage inputted from the battery 13. Therefore, when the voltage, which is inputted from the battery 13 to the controller 30, is within the normal range of the voltage, the operation of the booster 50 is stopped. The booster 50 is stopped when the booster 50 is not required. Therefore, the generation of the noise as well as the electric power consumption can be limited.

Furthermore, the threshold value Vth is set to be higher than the required minimum operating voltage value VCmin of the controller 30. Thereby, the voltage, which is inputted to the controller 30, can be always kept to be higher than the required minimum operating voltage value VCmin. In this way, the rebooting of the controller 30 or the stopping of the operation of the controller 30 can be appropriately avoided.

(3) In the present embodiment, the controller 30 includes the microcomputer 32 and the inverter driver 33. The microcomputer 32 outputs the control signal for controlling the operation of the inverter 20. The inverter driver 33 includes the boost circuit 330 and drives the inverter 20 based on the control signal. The booster 50 can output the boosted voltage to each of the microcomputer 32 and the inverter driver 33.

With the above construction, the rebooting of the microcomputer 32 or the stopping of the operation of the microcomputer 32 can be avoided. Also, the input voltage Vin, which is inputted to the boost circuit 330 of the inverter driver 33, can be kept to be equal to or higher than the predetermined voltage.

In a case where the booster 50 is absent, when the input voltage Vin, which is inputted to the boost circuit 330, is dropped, the output voltage Vout of the boost circuit 330 is also dropped. In such a case, it is required to construct the boost circuit 330 in such a manner that the switching elements 21-26 can be turned on even at the time of dropping of the output voltage Vout.

For example, as discussed above, the amount Q of electric charge of the capacitor 334, which is placed to be closest to the output side among the capacitors 333, 334 of the boost circuit 330, needs to satisfy the relationship of Qg×n<Q (n denotes the number of the high-side switching elements 21-23).

In a case where a capacitance of the capacitor 334 is denoted by C while the capacitor 334 is charged with the electric charge by the voltage V (=Vout), the amount Q of electric charge of the capacitor 334 is expressed by Q=CV. In order to satisfy the relationship of Qg×n<Q even at the time of dropping the output voltage Vout, the capacitance C of the capacitor 334 needs to be increased in view of the amount of drop of the output voltage Vout. Therefore, the size of the capacitor 334 is increased. Furthermore, the capacitance of the capacitor 333 also needs to be increased due to the same reason as that of the capacitor 334 discussed above, so that the size of the capacitor 333 is increased.

In contrast, according to the present embodiment, the input voltage Vin, which is inputted to the boost circuit 330, can be kept to be equal to or higher than the predetermined voltage. That is, the output voltage Vout of the boost circuit 330 can be kept to be equal to or higher than the corresponding predetermined voltage. Thus, the capacitances of the capacitors 333, 334 can be made small, and thereby the sizes of the capacitors 333, 334 can be made small. As a result, the size of the controller 30 can be made small.

(4) The control device 1 of the present embodiment further includes the regulator 42. The regulator 42 receives the electric power from the battery 13 and supplies the received electric power to the rotational angle sensor 29, which senses the rotational position of the motor 80. The booster 50 can output the boosted voltage to the regulator 42.

With the above construction, similar to the controller 30, the voltage, which is inputted to the regulator 42, can be always kept to be equal to or higher than the predetermined voltage. Thus, the rotational angle sensor 29 can correctly output the sensor output, and thereby the controller 30 can appropriately control the operation of the motor 80 based on the sensor output of the rotational angle sensor 29.

In the present embodiment, the regulator 41 and the torque sensor 94 are constructed in a manner similar to that of the regulator 42 and the rotational angle sensor 29 discussed above. Therefore, the advantages, which are similar to those discussed above with reference to the regulator 42 and the rotational angle sensor 29, can be achieved.

(5) In the present embodiment, the electric power steering apparatus 99 includes the control device 1 and the motor 80. The motor 80 is controlled by the control device 1 and outputs the assist torque, which assists the steering operation of the steering wheel 91 that is operated by the driver of the vehicle.

With the above construction, even when the voltage of the battery 13 is dropped due to, for example, the cranking of the engine, the control operation of the motor 80 can be maintained. Thus, the motor 80 can maintain the generation of the assist torque, which assists the steering operation of the steering wheel 91 that is operated by the driver of the vehicle. In this way, it is possible to alleviate the annoying feeling of the driver of the vehicle.

Furthermore, the size of the control device 1 can be made small, as discussed above. Therefore, the control device 1 can be easily installed to the space in the vehicle where the electric power steering apparatus 99 is installed.

Furthermore, a method (see, for example, JP5257389B2) of maintaining the steering assist while limiting the electric current supplied to the motor 80 may be used together in this embodiment to deal with the cranking of the engine without a need for a large external DC-DC converter.

Second Embodiment

Figure 5:
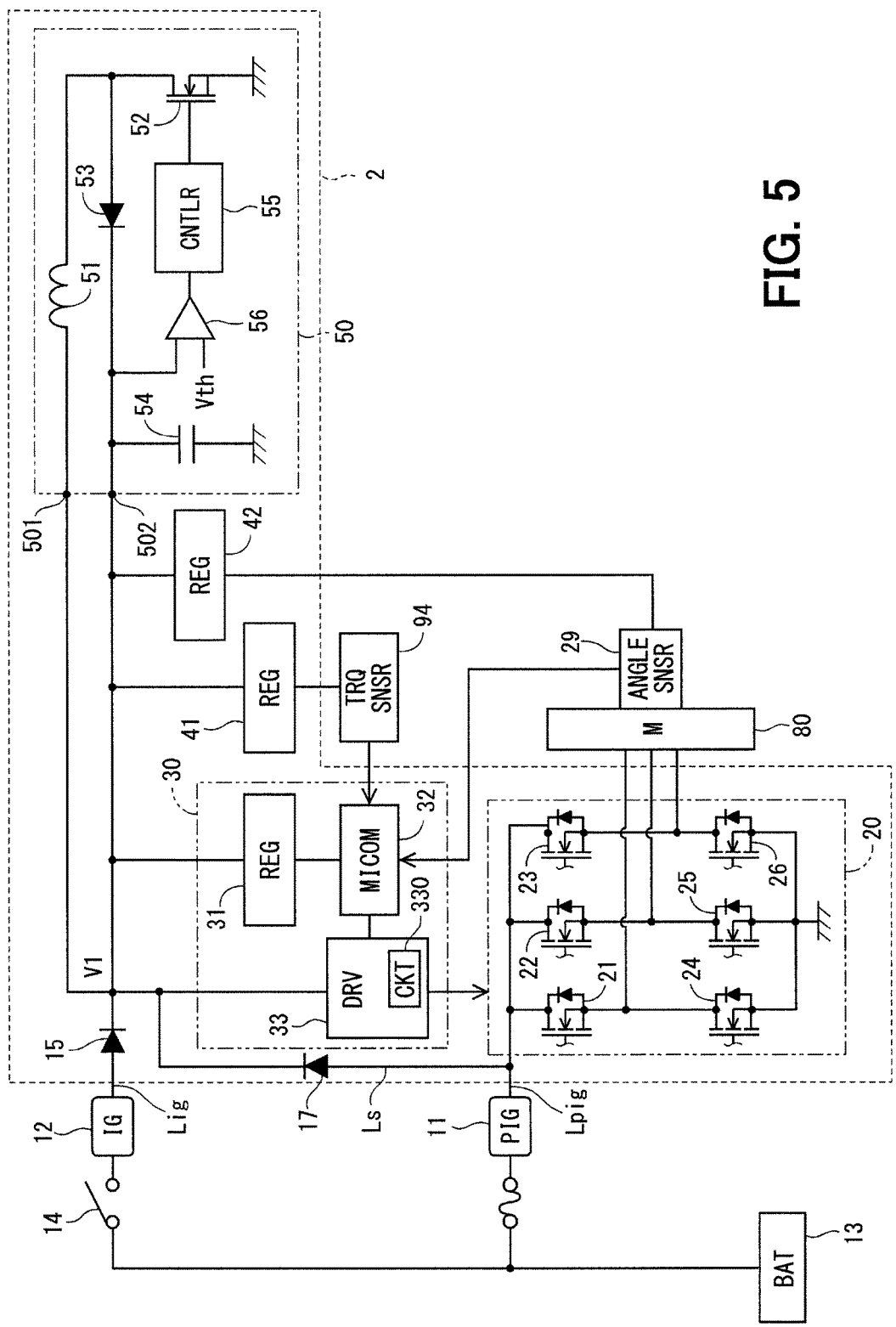
FIG. 5 is a schematic diagram showing a control device according to a second embodiment of the present disclosure.

A control device 2 according to a second embodiment of the present disclosure will be described with reference to FIG. 5.

The second embodiment differs from the first embodiment such that the control device 2 includes an electric power supply line Ls, which electrically connects between the PIG electric power source line Lpig and the IG electric power source line Lig. One end of the electric power supply line Ls is connected to a point between the electric power source terminal 11 and the inverter 20 in the PIG electric power source line Lpig, and the other end of the electric power supply line Ls is connected to the controller 30, the booster 50 and the regulators 41, 42. In this way, the electric power, which is supplied from the battery 13 through the PIG electric power source line Lpig, can be supplied to the controller 30, the booster 50 and the regulators 41, 42 through the electric power supply line Ls.

Furthermore, a diode 17 is connected to the electric power supply line Ls. The diode 17 is arranged such that a cathode of the diode 17 is placed on the side where the controller 30 and the booster 50 are placed, and the diode 17 rectifies the electric power, which flows through the electric power supply line Ls.

In the second embodiment, the controller 30, the booster 50 and the regulators 41, 42 can receive not only the electric power supplied from the battery 13 through the ignition terminal 12 but also the electric power supplied from the battery 13 through the electric power source terminal 11 and the electric power supply line Ls. In a case where both of the voltage of the electric power, which is supplied from the ignition terminal 12, and the voltage of the electric power, which is supplied from the electric power source terminal 11, drop below the threshold value Vth, the booster 50 can boost the voltage of the electric power supplied from one of the ignition terminal 12 and the electric power source terminal 11.

According to the second embodiment, the advantages, which are similar to those of the first embodiment, can be achieved. Furthermore, even when the supply of the electric power through the ignition terminal 12 is blocked at the time of, for example, turning off of the ignition switch 14, the voltage of the electric power supplied through the electric power source terminal 11 and the electric power supply line Ls can be boosted and can be inputted to, for example, the controller 30.

Other Embodiments

The motor of the present disclosure is not limited to the three-phase brushless motor. For example, the motor of the present disclosure may be a brushed electric motor. Furthermore, the electric power converter of the present disclosure is not limited to the three-phase inverter and may be, for example, an H-bridge circuit.

The booster of the present disclosure is not limited to the switching converter and may be of any other type, which boosts the voltage. Furthermore, the timing of executing the boosting of the voltage through the booster may be freely set.

The structure of the controller of the present disclosure is not limited to the one discussed above. For example, in another embodiment, the controller may be constructed such that the regulator supplies the electric power to each of the microcomputer and the inverter driver. Furthermore, the boost circuit, which is included in the inverter driver, is not limited to the charge pump circuit. For example, the boot circuit may be a bootstrap circuit.

The control device of the present disclosure is not necessarily applied to the electric power steering apparatus. That is, the control device of the present disclosure may be applied to any apparatus that includes an electric motor.

As discussed above, the present disclosure is not limited to the above embodiments and the modifications thereof. That is, the above embodiments and modifications thereof may be further modified in various ways without departing from the principle of the present disclosure.

What is claimed is:

1. A control device for controlling an operation of an electric motor, which is rotated when the electric motor is powered by electric power supplied from an electric power source, the control device comprising:
    an electric power converter that includes a plurality of switching elements, wherein the electric power converter converts the electric power supplied from the electric power source and supplies the converted electric power to the electric motor;
    a controller that is operated by the electric power supplied from the electric power source and controls an operation of the electric power converter; and a booster that is operable to boost a voltage of the electric power inputted from the electric power source and to output the boosted electric power source voltage to the controller, wherein the controller includes:
  a microcomputer that is configured to output a control signal, which is used to control the operation of the electric power converter; and
  a boost circuit that is provided separately from the booster and is operable to boost the voltage of the electric power inputted from the electric power source and to output the boosted electric power source voltage of the boost circuit to the electric power converter;
the booster is operable to output the boosted electric power source voltage to the controller to power the microcomputer and to the boost circuit; and
the boost circuit is further operable to boost the boosted electric power source voltage inputted from the booster to the controller and to output the boosted voltage to the electric power converter.

2. The control device according to claim 1, wherein the booster boosts the voltage of the electric power inputted from the electric power source when the voltage of the electric power inputted from the electric power source is lower than a threshold value.

3. The control device according to claim 2, wherein the threshold value is lower than a minimum value of a normal range of the voltage of the electric power inputted from the electric power source and is higher than a required minimum operating voltage value of the controller.

4. The control device according to claim 1, wherein the controller includes an electric power converter driver that includes the boost circuit and drives the plurality of switching elements of the electric power converter based on the control signal, and wherein the booster is operable to output the boosted electric power source voltage to the electric power converter driver.

5. An electric power steering apparatus comprising:
the control device of claim 1; and
  the electric motor that is controllable by the control device to output an assist torque, which assists a steering operation of a steering wheel that is operated by a driver of a vehicle.

6. The control device according to claim 1, wherein the controller includes a regulator that regulates the boosted electric power source voltage to a predetermined voltage required to operate the microcomputer and outputs the predetermined voltage to the microcomputer.

7. The control device according to claim 1, wherein the boosted electric power source voltage outputted from the booster is lower than the boosted electric power source voltage outputted from the boost circuit.

8. A control device for controlling an operation of an electric motor, which is rotated when the electric motor is powered by electric power supplied from an electric power source, the control device comprising:
an electric power converter that includes a plurality of switching elements, wherein the electric power converter converts the electric power supplied from the electric power source and supplies the converted electric power to the electric motor;
a controller that is operated by the electric power supplied from the electric power source and controls an operation of the electric power converter;
a booster that is operable to boost a voltage of the electric power inputted from the electric power source and to output the boosted voltage to the controller, and
a regulator that supplies the electric power, which is supplied from the electric power source, to a rotational angle sensor that senses a rotational position of the electric motor, wherein the booster is operable to output the boosted voltage to the regulator.

* * * * *